United States Patent [19]

Schäfer

[11] 4,208,574

[45] Jun. 17, 1980

[54] TEMPERATURE CONTROLLABLE HEATER PLATE FOR MOLDS

[75] Inventor: Manfred Schäfer, Hemmingen, Fed. Rep. of Germany

[73] Assignee: Werner & Pfleiderer, Stuttgart, Fed. Rep. of Germany

[21] Appl. No.: 885,206

[22] Filed: Mar. 10, 1978

[30] Foreign Application Priority Data

Mar. 17, 1977 [DE] Fed. Rep. of Germany ....... 2711558

[51] Int. Cl.$^2$ .............................................. H05B 3/72
[52] U.S. Cl. ................................... 219/539; 219/201; 219/243; 219/245; 249/78
[58] Field of Search ............... 219/457, 385, 466, 467, 219/530, 540, 537, 483, 486, 421, 243; 100/93 R, 93 P; 249/78; 425/143, 144, 384, 407, 404, 445, 446; 156/583

[56] References Cited

U.S. PATENT DOCUMENTS

| | | |
|---|---|---|
| 1,618,406 | 2/1927 | Brundidge ............................ 156/583 |
| 3,317,709 | 5/1967 | Beasley ................................ 219/466 |
| 3,335,459 | 8/1967 | Tyrner ................................. 219/201 |
| 3,393,292 | 7/1968 | Ritscher .............................. 219/552 |
| 3,412,231 | 11/1968 | McElligott .......................... 219/201 |
| 3,624,836 | 11/1971 | Rohdiw ............................... 219/243 |
| 4,081,313 | 3/1978 | McNeilly et al. .................... 219/343 |

Primary Examiner—B. A. Reynolds
Assistant Examiner—Bernard Roskoski
Attorney, Agent, or Firm—Hane, Roberts, Spiecens & Cohen

[57] ABSTRACT

A heater plate for plunger-type molding presses comprises a plurality of electrically heated heating elements which are inserted into holes through the plate. These holes are disposed in rows parallel to the peripheral outline of the plate so that the density of the heating elements decreases toward the center of the plate. The heating elements are interconnected and also connected to a temperature control device so that the heating elements can be selectively heated whereby the plate can be uniformly heated in spite of higher heat loss at marginal portions of the plate.

6 Claims, 3 Drawing Figures

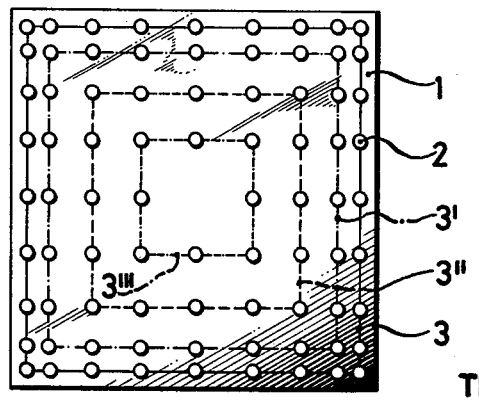
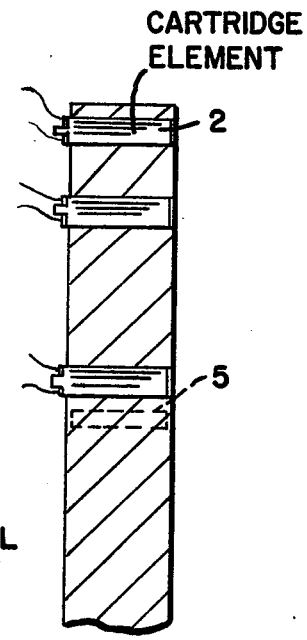
FIG. 1
FIG. 1A
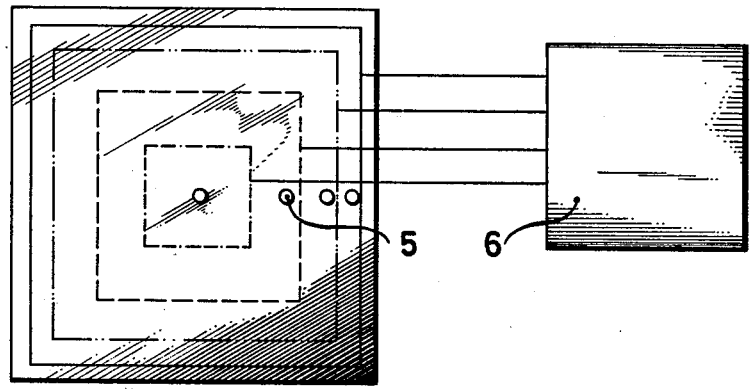
FIG. 2

TEMPERATURE CONTROLLABLE HEATER PLATE FOR MOLDS

The present invention relates to a heater plate for plunger-type molding presses having a plurality of electrically heatable heating elements distributed over the surface of the plate.

BACKGROUND

The production of high-quality finished parts having a base of rubber requires exact temperature control within the mold during the vulcanization of such parts. Such a temperature control pre-supposes that equal temperatures can be maintained over the entire surface of the heater plate which is connected to the mold.

However, this requirement is affected by the heat radiation which varies, depending on the size of the plate, at the marginal portions of the heater plate. It has been found to be difficult to counteract such temperature differences without substantial expense. The high pressure acting upon the heater plate during the molding operation also causes a limit for the arrangement of heating elements within the heater plate.

In order to obtain a relatively short time for heating the plate, it is advantageous to install the highest possible heat output which is capable of compensating for the losses of heat in the heater plate. Moreover, such high heating permits regulation of the heating output by zones in a simple manner.

THE INVENTION

A broad object of the present invention is to provide a novel and improved heater plate with which a rapid and uniform heating can be effected over the entire surface of the plate and with which sectionwise by connecting or disconnecting several independent heating elements even small surface portions of the heater plate can be accurately temperature controlled.

SUMMARY OF THE INVENTION

The afore-referred to object and other objects, features and advantages which will be pointed out hereinafter are obtained by providing heating elements in bore holes which are arranged perpendicular relative to the surfaces of the heater plate and the axes of which are disposed in lines which extend parallel to the peripheral outline of the heater plate, thereby in effect dividing the heater plate into a plurality of congruent or similar areas, the distances between said lines increasing towards the center of the plate.

As a result, a temperature control of the heater plate is obtained which extends substantially portion by portion over the entire surface of the heater plate, so that, depending on the size of heater plate to be selected and the heat loss to be expected in the marginal areas, a concentrated arrangement of the heating zones and, thus, a compensation for the heat loss is obtained without any appreciable weakening or reducing of the cross-section of the heater plate.

According to a further feature of the invention, an automatic regulation of the temperature of the heater plate over the entire surface thereof is automatically obtained as a function of the selected temperature relative to the actual temperatures.

BRIEF DESCRIPTION OF THE INVENTION

In the accompanying drawing embodiments of the invention are shown by way of illustration and not by way of limitation.

IN THE DRAWING

FIG. 1 is a plan view which shows diagrammatically a heater plate in accordance with the invention;

FIG. 1A shows a portion of the heater plate in FIG. 1 in section as taken along line 1A—1A therein.

FIG. 2 shows the heater plate according to FIG. 1 with heating elements chains connected to a temperature control device.

DETAILED DESCRIPTION OF THE INVENTION

The heater plate 1 of FIG. 1 comprises, distributed over its entire surface, a plurality of heating elements such as cartridges 2 of conventional design which are inserted into bore holes arranged perpendicularly relative to the top and bottom sides of the plate.

The heating cartridges are arranged in the heater plate along a plurality of rows or limit lines 3, 3', 3'', 3''' which in effect divide the heater plate into a plurality of separate areas which constitute congruent partial areas of the surfaces of the heater plate.

As a result, heating cartridge chains are formed which are electrically connected together in the heater plate and which heat the entire plate or, optionally, only selected areas thereof.

Due to the fact that the distances between the boundary lines of all the individual surface areas increase towards the center of the plate, temperature differences present in the marginal zones of the heater plate are compensated by denser arrangement of the heating cartridge chains so that substantially identical temperatures are established in each limited surface area of the heater plate.

By providing temperature measurement elements 5 of conventional design between the chains of the heating cartridges, in combination with a conventional regulating device 6, the temperature can be automatically regulated in accordance with a desired predetermined value.

Thus, in accordance with the manner of operation as shown in FIG. 2, a symmetrically adjustable heating of the heater plate is made possible in cases in which high demands are made on the distribution of the temperature over the entire surface of the heater plate. The compensation for heat losses which may occur to an increased extent in the marginal regions of the plate is in this manner effected two ways, namely, by closer arrangement of the heating cartridges in the marginal regions of the plate and by the zonal control of the heating cartridges as a function of the relationship of the predetermined desired temperature to the actual temperature.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A heater plate assembly for a plunger-type molding press, said heater plate assembly comprising:

a heater plate having upper and lower surfaces and a peripheral edge, said plate having a center, said plate being provided with a plurality of holes extending into the plate perpendicularly to the top and bottom surfaces, said holes being disposed in a plurality of spaced rows extending parallel to the peripheral edge of the plate and of successively increasing distance from the center of the plate to divide the plate into a plurality of regions constituting congruent partial areas of the surfaces of the plate, a corresponding plurality of selectively electrically heatable heating members, each disposed in one of said holes thereby dividing the body of the plate into a plurality of heatable areas of the heater plate, the spacing between successive rows of holes and heating members therein progressively decreasing from the center of said heater plate toward the peripheral edge of said heater plate, thereby increasing the density of the heating members from the center of the plate towards the peripheral edge, and control means for individually controlling the heating of the heating members and thus of the temperatures in said heatable areas.

2. The heater plate according to claim 1 comprising a temperature responsive means coupled with each of said heatable areas.

3. The heater plate according to claim 2 wherein said control means is connected with said temperature responsive means for independently regulating the heating of the heating members in each of said heatable areas.

4. The heater plate according to claim 1 wherein said temperature responsive means comprises temperature measurement elements disposed between the rows of heating members, one for each row.

5. The heater plate according to claim 1 wherein said rows of holes form respective perimetral outlines extending parallel to said peripheral edge and of successively increasing size.

6. The heater plate according to claim 1 wherein said rows of holes form rectangular arrays of successively increasing size.

* * * * *